United States Patent [19]

Brown

[11] Patent Number: 4,761,726
[45] Date of Patent: Aug. 2, 1988

[54] VARIABLE SPEED CONSTANT FREQUENCY POWER SYSTEM WITH BOOST CONVERTER AUXILIARY OUTPUT

[75] Inventor: Stuart C. Brown, Lima, Ohio

[73] Assignee: Westinghouse Electric Corp., Pittsburgh, Pa.

[21] Appl. No.: 111,961

[22] Filed: Oct. 23, 1987

[51] Int. Cl.$^4$ .............................................. H02H 7/00
[52] U.S. Cl. ........................................ 363/51; 363/37; 363/35; 307/82; 307/86
[58] Field of Search .................... 363/51, 35, 37, 86, 363/87, 88, 89, 124, 126; 323/222, 267, 272; 307/64, 72, 75, 82, 85, 86

[56] References Cited

U.S. PATENT DOCUMENTS

| | | | |
|---|---|---|---|
| 3,986,100 | 10/1976 | Bierholm et al. | 363/37 X |
| 4,340,931 | 7/1982 | Endo et al. | 363/37 X |
| 4,454,930 | 6/1984 | Nomura et al. | 307/82 |
| 4,533,986 | 8/1985 | Jones | 323/222 |
| 4,545,464 | 10/1985 | Nomura | 363/37 |
| 4,554,501 | 11/1985 | Baker | 322/29 |
| 4,574,341 | 3/1986 | Hellegaard et al. | 363/89 |
| 4,670,827 | 6/1987 | Schneider | 363/37 |

Primary Examiner—Peter S. Wong
Attorney, Agent, or Firm—R. P. Lenart

[57] ABSTRACT

A DC link variable speed constant frequency power system is provided with a voltage boost circuit connected to receive voltage from a pair of DC link conductors and to supply voltage to an auxiliary supply bus. During normal system operation, the voltage boost circuit transfers the DC link voltage to the auxiliary supply bus. When a system fault occurs, such that the DC link voltage is reduced, the voltage boost circuit is activated to boost the reduced DC link voltage level and supply that boosted voltage level to the auxiliary supply bus.

7 Claims, 1 Drawing Sheet

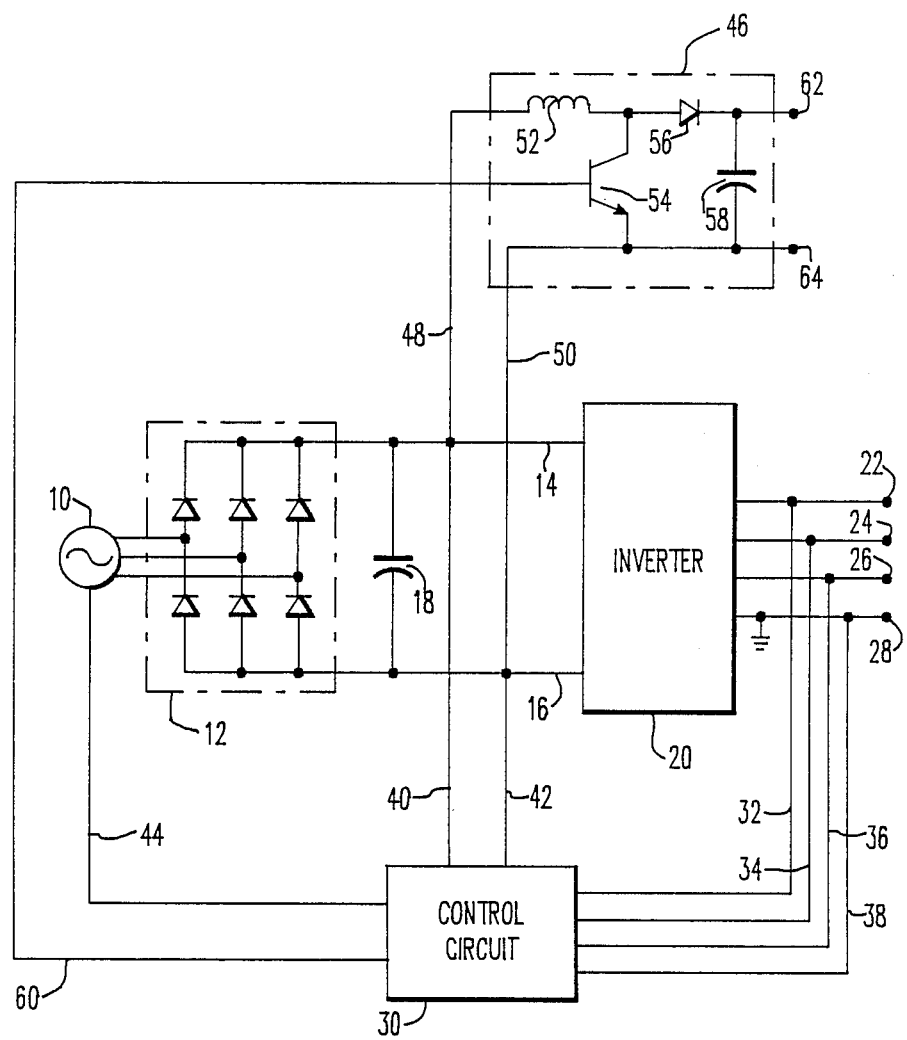

VARIABLE SPEED CONSTANT FREQUENCY POWER SYSTEM WITH BOOST CONVERTER AUXILIARY OUTPUT

BACKGROUND OF THE INVENTION

This invention relates to variable speed constant frequency electrical power systems and more particularly to such systems which include an auxiliary power output.

DC link variable speed constant frequency (VSCF) electrical power systems, such as those typically used in aircraft applications, include a generator which is driven at a variable speed to supply a DC voltage to an inverter by way of a pair of DC link conductors. The output voltage of the generator is controlled by a regulator that monitors the inverter output and adjusts the generator field current to regulate the DC link voltage. In some DC link VSCF aircraft applications, it becomes necessary to provide auxiliary power supplies such as 270 volts DC to energize control service actuators or 28 volts DC to energize avionic units. These auxiliary power supplies can be fed from the 115 volts AC inverter output. However, due to the vulnerability of these auxiliary supplies to an inverter failure, the system redundancy and flexibility are greatly reduced. Furthermore, during AC bus faults, the AC voltage may be reduced to zero.

Another approach, which bypasses the inverter and vulnerability problem, is to feed the auxiliary supplies directly from the DC link conductors, which receive power from the generator through a rectifier. Although the reduced voltage problem still remains, it is not as severe. For example, under AC bus fault conditions, the DC link voltage may be intentionally reduced to as little as 35% of its normal value in order to limit current, voltage and thermal stresses in the inverter. The size and weight of an auxiliary power supply would have to be considerably increased in order to regulate and maintain normal output voltage under such reduced input voltage conditions. It is therefore desirable to provide a means of compensating for the reduced input voltage to the auxiliary power supplies, without increasing their range of regulation, which would require an increase in size and weight.

SUMMARY OF THE INVENTION

The present invention compensates for reduced DC link voltage during AC fault conditions by inserting a voltage boosting converter between the DC link conductors and the auxiliary power supply input. An electric power system constructed in accordance with the present invention comprises an electrical generator for producing a DC voltage on a pair of DC link conductors and an inverter for converting the DC voltage to a constant frequency AC voltage that is delivered to the power system bus conductors. A voltage boost circuit is connected between the DC link conductors an an auxiliary supply bus. A control circuit is provided for regulating the DC link voltage by controlling the output of the generator in response to the AC output of the converter and for regulating the output voltage of the boost circuit when the power system bus conductors are subjected to a fault.

This invention also encompasses a method of operating a DC link variable speed constant frequency power supply having a generator which supplies DC voltage to an inverter via a pair of DC link conductors, that includes the steps of regulating the generator output to produce a first DC voltage between the DC link conductors under normal operating conditions, and to produce a second DC voltage between the DC link conductors under fault conditions. Under normal conditions, the first DC link voltage is transferred to an auxiliary power supply bus. Under fault conditions, the second DC link voltage is boosted to a predetermined magnitude, and this boosted voltage is transferred to the auxiliary supply bus.

BRIEF DESCRIPTION OF THE DRAWINGS

The single FIGURE is a schematic diagram of a DC link VSCF power system constructed in accordance with one embodiment of the present invention.

DESCRIPTION OF THE PREFERRED EMBODIMENT

Referring to the drawing, FIG. 1 is a schematic diagram of a VSCF power system constructed in accordance with one embodiment of the present invention. The system includes a variable speed generator 10 having its outputs connected through a bridge rectifier 12 to a pair of DC link conductors 14 and 16. A smoothing capacitor 18 is connected between the DC link conductors. An inverter 20 receives the DC link voltage from conductors 14 and 16 and produces a three phase constant frequency AC output voltage on the power system bus including conductors 22, 24, 26 and 28. A control circuit 30 monitors the AC output voltage of the inverter by way of lines 32, 34, 36 and 38, and also monitors the DC link voltage by way of lines 40 and 42. Under normal system operation, the control circuit includes a voltage regulator which operates to control the DC link voltage by controlling the exciter field current in the generator 10 by way of line 44, thereby controlling the inverter output when the generator is operated within its normal design speed range. U.S. Pat. No. 4,554,501, issued Nov. 19, 1985 to Baker disclosed a VSCF power system which includes the above described elements and is hereby incorporated by reference.

The VSCF power system of the present invention also includes a boost converter circuit 46, connected to the DC link conductors by way of input lines 48 and 50. The boost converter includes an inductor 52 having one end connected to DC link conductor 14. A controllable solid state switching device in the form of transistor 54 is connected between a second end of inductor 52 and DC link conductor 16. A branch circuit including the series connector of diode 56 and capacitor 58 is connected across the transistor 54.

If the AC output conductors of the inverter are subjected to a fault which reduces or eliminates the AC output voltage, the control circuit 30 will intentionally reduce the DC link voltage by controlling the output of generator 10 to a voltage level which may be, for example, 35% of the normal DC link voltage, in order to limit current, voltage and thermal stresses in the inverter. Under these fault conditions, the control circuit 30 also produces a signal on line 60 that periodically turns transistor 54 on and off, thereby boosting the voltage on an auxiliary power bus comprising conductors 62 and 64.

The particular converter circuit 46 shown in FIG. 1 is known to those skilled in the art as a boost chopper. That circuit, or other well known voltage boost circuits can be used to increase the DC link voltage, under fault conditions, as required by this invention.

The boost circuit illustrated in FIG. 1 has the advantage in this application of providing inherent filtering by its inductor and capacitor. This filtering helps isolate switching noise produced by auxiliary power supplies which may be connected to conductors 62 and 64, and isolates this switching noise from the DC link conductors under normal operating conditions.

Under fault conditions, the duty cycle of the switching transistor 54 in converter circuit 46 determines the amount of voltage boost. When the transistor is on, the inductor is connected across the DC link conductors. When the transistor is off, the inductor is connected in series with the DC link conductors. The basic principle is that the average voltage across the inductor is zero. The volt-second product during the transistor on time must be equal to the volt-second product during the transistor off time. By increasing the transistor on time, the inductor is exposed to the DC link voltage for a longer time and a higher inductor voltage will result when the transistor is turned off. The boost converter output voltage, when the transistor is off, will be the sum of the DC link voltage and the inductor voltage. The output capacitor 58 averages the off state and on state voltages. Diode 56 prevents the capacitor from discharging when the transistor is on. The operating frequency of the transistor 54 is determined by the particular design requirements of the system.

One advantage of the preferred embodiment is that the booster circuit switching transistor need only operate when the DC link voltage is detected to be below the minimum required for the auxiliary power supplies. Since this may occur for short periods of time, for example five seconds, during AC power bus faults, the only losses contributing to the average power dissipation during normal operation are the diode forward drop loss and the inductor resistance loss. Inductor core loss and capacitor equivalent series resistance loss are negligible since the ripple voltages and currents are relatively low when the chopper is not active. Therefore, this type of booster circuit minimizes its effects on the efficiency, size and weight of the VSCF power system, without interfering with its intended function.

It should now be apparent to those skilled in the art that in the system of FIG. 1, the control circuit 30 regulates the generator output voltage to produce a first DC voltage between the DC link conductors under normal operating conditions and to produce a second DC link voltage between the DC link conductors under fault conditions. Under normal conditions, the transistor 54 in boost converter 46 is off and the first DC link voltage is transferred to the auxiliary power supply bus conductors 62 and 64. Under fault conditions, switching transistor 54 is periodically turned on and off, thereby boosting the second DC link voltage level to produce a boosted DC voltage on auxiliary bus conductors 62 and 64. In one embodiment, the magnitude of this boosted second DC voltage may be substantially equal to the first DC link voltage, that occurs during normal system operation.

Although the present invention has been described in terms of what is at present believed to be its preferred embodiment, it will be apparent to those skilled in the art that various changed may be made without departing from the scope of the invention. It is therefore intended that the appended claims cover such changes.

What is claimed is:

1. An electric power system, comprising:
    an electrical generator for producing a DC voltage on a pair of DC link conductors;
    an inverter for converting said DC voltage to a constant frequency AC output voltage on an AC output bus;
    a voltage boost circuit connected between said DC link conductors and an auxiliary supply bus; and
    a control circuit for regulating said DC voltage by controlling the output of said generator in response to said AC output voltage, and for regulating an output voltage of said boost circuit on said auxiliary supply bus, when said AC output bus is subjected to a fault.

2. An electric power system, as recited in claim 1, wherein:
    said control circuit regulates said DC voltage to a first level during normal operation; and
    said control circuit regulates said DC voltage to a second level under fault conditions.

3. An electric power system, as recited in claim 1, wherein:
    said voltage boost circuit is inactive during normal operation; and
    said control circuit activates said voltage boost circuit during fault conditions.

4. An electric power system, as recited in claim 1, wherein said voltage boost circuit comprises:
    an inductor having a first end electrically connected to a first one of said DC link conductors;
    a controllable solid state switch, responsive to said control circuit and electrically connected between a second end of said inductor and a second one of said DC link conductors; and
    a circuit branch, including a diode and a capacitor electrically connected in series, said circuit branch being electrically connected in parallel with said solid state switch, and said auxiliary bus being connected across said capacitor.

5. An electric power system, as recited in claim 4, wherein:
    said control circuit maintains said solid state switch in an off condition when said DC link voltage is above a preselected magnitude.

6. A method of operating a DC link, variable speed, constant frequency power system having a generator which supplied DC voltage to an inverter via a pair of DC link conductors, said method comprising the steps of:
    regulating the generator output voltage to produce a first DC voltage between said DC link conductors under normal operating conditions, and to produce a second DC link voltage between said DC link conductors under fault conditions;
    transferring said first DC voltage to an auxiliary supply bus under normal operating conditions;
    boosting said second DC voltage to produce a boosted voltage during fault conditions; and
    transferring the boosted voltage to said auxiliary supply bus under fault conditions.

7. The method of claim 6, wherein:
    the magnitude of the boosted voltage is substantially equal to said first DC voltage level.

* * * * *